US008948929B2

(12) United States Patent
Chun et al.

(10) Patent No.: US 8,948,929 B2
(45) Date of Patent: Feb. 3, 2015

(54) VEHICLE MANAGEMENT AND CONTROL FOR SAFE DRIVING AND COLLISION AVOIDANCE (71) Applicant: KT Corporation, Gyeonggi-do (KR)

(72) Inventors: Young-Sam Chun, Seoul (KR); Han-Lim Kim, Seoul (KR); Jin-Woo Baek, Seoul (KR); Jae-Won Choi, Seoul (KR)

(73) Assignee: KT Corporation, Gyeonggi-do (KR)

( * ) Notice: Subject to any disclaimer, the term of this patent is extended or adjusted under 35 U.S.C. 154(b) by 37 days.

(21) Appl. No.: 13/954,104

(22) Filed: Jul. 30, 2013

(65) Prior Publication Data
US 2014/0032015 A1 Jan. 30, 2014

(30) Foreign Application Priority Data

Jul. 30, 2012 (KR) .................... 10-2012-0082943

(51) Int. Cl.
G08G 1/16 (2006.01)
G08G 1/01 (2006.01)
(52) U.S. Cl.
CPC .............. G08G 1/166 (2013.01); G08G 1/0112 (2013.01); G08G 1/0133 (2013.01); G08G 1/0145 (2013.01); G08G 1/164 (2013.01)
USPC ............... 701/2; 701/300; 701/301; 701/302; 342/57
(58) Field of Classification Search
None
See application file for complete search history.

(56) References Cited

U.S. PATENT DOCUMENTS

| 5,546,311 | A * | 8/1996 | Sekine | 701/93 |
| 5,875,183 | A * | 2/1999 | Nitadori | 370/328 |
| 5,952,959 | A * | 9/1999 | Norris | 342/357.34 |
| 6,026,347 | A * | 2/2000 | Schuster | 701/301 |
| 6,169,940 | B1 * | 1/2001 | Jitsukata et al. | 701/23 |
| 6,223,117 | B1 * | 4/2001 | Labuhn et al. | 701/93 |
| 6,236,337 | B1 * | 5/2001 | Beier et al. | 340/905 |
| 6,313,758 | B1 * | 11/2001 | Kobayashi | 340/932 |
| 6,502,034 | B1 * | 12/2002 | Miller | 701/301 |
| 6,615,137 | B2 * | 9/2003 | Lutter et al. | 701/301 |
| 6,985,089 | B2 * | 1/2006 | Liu et al. | 340/903 |
| 7,289,019 | B1 * | 10/2007 | Kertes | 340/435 |
| 7,302,321 | B2 * | 11/2007 | Suzuki et al. | 701/23 |
| 7,522,092 | B2 * | 4/2009 | Okai et al. | 342/70 |
| 7,831,345 | B2 * | 11/2010 | Heino et al. | 701/23 |
| 7,973,674 | B2 * | 7/2011 | Bell et al. | 340/901 |

(Continued)

FOREIGN PATENT DOCUMENTS

| KR | 1020100063472 A | 6/2010 |
| KR | 1020100124370 A | 11/2010 |
| KR | 1020110013874 A | 2/2011 |

Primary Examiner — Jonathan M Dager
(74) Attorney, Agent, or Firm — IP Legal Services, LLC (57) ABSTRACT The disclosure is related to a method of managing and controlling vehicles for safe driving. In the method, at least one virtual zone may be defined based on information collected from a plurality of vehicles in motion and related servers in real time. Vehicles may be grouped into at least one vehicle groups according to a predetermined similarity condition based on the collected information. An abnormal driving pattern model may be generated based on a driving pattern of each vehicle in each vehicle group. At least one area of a virtual zone may be designated as a spot when at least one vehicle having a driving pattern matched with the abnormal driving pattern model in the at least one area. Safe driving information may be transmitted to at least one vehicle having driving patterns matched with attributes of the spot among vehicles entering each virtual zone.

20 Claims, 7 Drawing Sheets

(56) References Cited

U.S. PATENT DOCUMENTS

| | | | |
|---|---|---|---|
| 7,991,551 B2* | 8/2011 | Samuel et al. | 701/301 |
| 8,306,727 B2* | 11/2012 | Morselli et al. | 701/300 |
| 8,571,786 B2* | 10/2013 | Iwasaki et al. | 701/300 |
| 8,643,505 B2* | 2/2014 | Tsuda et al. | 340/903 |
| 2002/0003488 A1* | 1/2002 | Levin et al. | 342/70 |
| 2003/0102997 A1* | 6/2003 | Levin et al. | 342/57 |
| 2007/0159354 A1* | 7/2007 | Rosenberg | 340/902 |
| 2010/0045482 A1* | 2/2010 | Strauss | 340/903 |
| 2010/0070128 A1* | 3/2010 | Johnson | 701/33 |
| 2010/0094509 A1* | 4/2010 | Luke et al. | 701/45 |
| 2010/0138100 A1 | 6/2010 | Kim et al. | |
| 2010/0234071 A1* | 9/2010 | Shabtay et al. | 455/562.1 |
| 2010/0274440 A1* | 10/2010 | Kim et al. | 701/33 |
| 2013/0116859 A1* | 5/2013 | Ihlenburg et al. | 701/2 |
| 2013/0147638 A1* | 6/2013 | Ricci | 340/905 |
| 2013/0321179 A1* | 12/2013 | Santucci et al. | 340/990 |
| 2014/0095058 A1* | 4/2014 | Patel et al. | 701/117 |

\* cited by examiner

VEHICLE MANAGEMENT AND CONTROL FOR SAFE DRIVING AND COLLISION AVOIDANCE

CROSS-REFERENCE TO PRIOR APPLICATIONS

The present application claims priority under 35 U.S.C. §119 to Korean Patent Application No. 10-2012-0082943 (filed on Jul. 30, 2012), which is hereby incorporated by reference in its entirety.

BACKGROUND

The present disclosure relates to machine to machine (M2M) communication, more particularly, to assisting, managing, and controlling vehicles for safe driving and for collision avoidance.

M2M communication allows devices to communicate with each other through automated data exchange without or with human intervention. That is, M2M devices are coupled to and communicate with each other through a communication network. Such M2M devices collect information and share the collected information among M2M devices or related servers. A related server may process such collected information and control a predetermined system or provide a related service based on the processing result without human intervention.

Due to such advantages, M2M communication has been applied to various application fields such as utility meters, traffic control, telemedicine, billing systems, telematics and in-vehicle entertainment, and so forth. Lately, many studies have been actively made to develop and improve managing and controlling auto vehicles in motion for safe driving and collision avoidance through M2M communication

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a vehicle in motion may be managed or controlled based on changes in driving context of surrounding vehicles.

In accordance with another aspect of the present invention, various types of information may be collected from vehicles in motions and related servers, an abnormal driving pattern model may be generated based on the collected information, and a vehicle having a driving pattern matched with the generated abnormal driving pattern model may be managed and controlled for safe driving or for collision avoidance.

In accordance with at least one embodiment, a method may be provided for managing and controlling vehicles for safe driving. The method may include defining at least one virtual zone based on information collected from a plurality of vehicles in motion and related servers in real time, grouping vehicles into at least one vehicle groups according to a predetermined similarity condition based on the collected information, generating an abnormal driving pattern model based on a driving pattern of each vehicle in each vehicle group, designating at least one area of a virtual zone as a spot when at least one vehicle having a driving pattern matched with the abnormal driving pattern model in the at least one area, and transmitting safe driving information to at least one vehicle having driving patterns matched with attributes of the spot among vehicles entering each virtual zone.

The collected information may include vehicle information, user profile information, weather information, traffic information, road condition information, accident information, and construction information. The information may be continuously collected from the plurality of vehicles in motion and the related server and is changed in time. The at least one defined virtual zone may be modified or eliminated according to the continuously collected and changed information.

The at least one defined virtual zone may be a target geographical area for managing and controlling vehicles passing through the target geographical area. The target geographical area may have attributes matched with predetermined management conditions.

The grouping vehicles may include detecting vehicles having similarities matched with the predetermined similarity condition based on vehicle information and user profile information obtained from the collected information, and grouping the detected vehicles as a same vehicle group.

The predetermined similarity condition may include at least one of similarities between drivers, similarities between vehicles, and similarities between drivers and vehicles.

The grouping vehicles may include grouping vehicles entering into or locating in a virtual zone to at least one vehicle group according to the predetermined similarity condition. The grouping vehicles may also include updating the at least one vehicle group when at least one of associated vehicles leaves the virtual zone and when at least one vehicle having the predetermined similarities enters the virtual zone.

The generating an abnormal driving pattern model may include obtaining driving patterns of vehicles in each vehicle group based on the collected information, analyzing the obtained driving patterns by comparing a driving pattern of one vehicle with others and finding abnormal driving patterns among the obtained driving patterns, and modeling the abnormal driving patterns based on the analysis result to generate the abnormal driving pattern model for each vehicle group.

The generating an abnormal driving pattern model may include updating the generated abnormal driving pattern model of each vehicle group by repeatedly performing the obtaining the driving patterns, the analyzing the obtained driving patterns, and the modeling the abnormal driving patterns.

The spot may be generated, modified, and eliminated according to movements of vehicles, road conditions, weather conditions, and constructions in a corresponding virtual zone.

The designating at least one area of a virtual zone as a spot may include analyzing correlation between one spot with others in an associated virtual zone, and updating the associated virtual zone based on the analysis result.

The designating at least one area of a virtual zone as a spot may include collecting information from vehicles passing through the generated spot, maintaining the generated spot when the vehicles have driving patterns matched with attributes of the generated spot based on the collected information, and eliminating the generated spot when the vehicles have no driving patterns matched with attributes of the generated spot based on the collected information.

The safe driving information may include velocity matching information for synchronizing speeds of vehicles associated with a same vehicle group or associated with a same spot.

In accordance with at least one embodiment, a server may be provided for managing and controlling vehicles for safe driving. The server may include a virtual zone generator, a vehicle group generator, a pattern model generator, a spot generator, and a vehicle controller. The virtual zone generator may be configured to define at least one virtual zone based on information collected from a plurality of vehicles in motion and related servers in real time. The vehicle group generator may be configured to group vehicles into at least one vehicle groups according to a predetermined similarity condition based on the collected information. The pattern model generator may be configured to generate an abnormal driving pattern model based on a driving pattern of each vehicle in each vehicle group. The spot generator may be configured to designate at least one area of a virtual zone as a spot when at least one vehicle having a driving pattern matched with the abnormal driving pattern model in the at least one area. The vehicle controller may be configured to transmit safe driving information to at least one vehicle having driving patterns matched with attributes of the spot among vehicles entering each virtual zone.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, vehicles in motion may be assisted or controlled based on information collected in real time for safe driving or for collision avoidance. For example, a system may manage and control a plurality of vehicles moving in a group. Particularly, a system may collect driving context information and driving patterns of a plurality of vehicles moving in a group, estimate influences among vehicles based on the collected information, and provide safe driving information and velocity matching information for collision avoidance in accordance with at least one embodiment. Hereinafter, such a system will be described in more detail with reference to FIG. 1.

Figure 1:
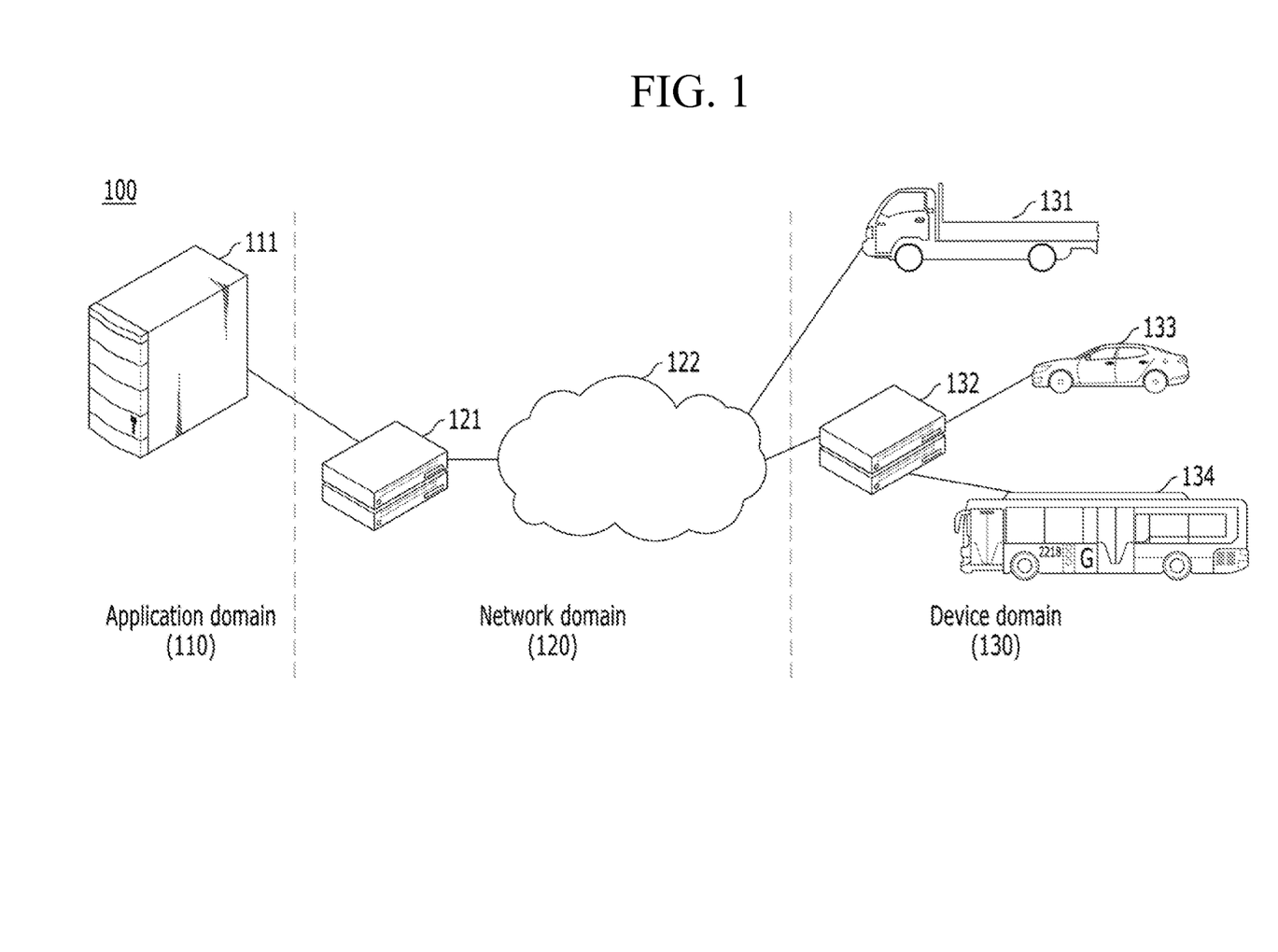
FIG. 1 illustrates a machine to machine (M2M) system of assisting, managing, and controlling driving of vehicle in accordance with at least one embodiment of the present invention.

FIG. 1 illustrates a machine to machine (M2M) system of assisting, managing, and controlling driving of vehicle in accordance with at least one embodiment of the present invention.

Referring to FIG. 1, system 100 may assist, manage, or control driving vehicles in accordance with at least one embodiment. For example, system 100 senses changes in driving states of surrounding vehicles and assists, manages, or controls driving a target vehicle based on the sensed changes. Such system 100 may be implemented based on a machine to machine (M2) technology and referred to as M2M system 100. System 100 may include server 111, M2M service capabilities 121, communication network 122, M2M device 131 directly coupled to communication network 122, M2M gateway 132, and M2M devices 133 and 134 indirectly coupled to communication network 122 through M2M gateway 132. Such system 100 may be logically divided into application domain 110, network domain 120, and M2M device domain 130 according to functions of constituent elements. For example, application domain 110 may include server 111, network domain 120 may include M2M service capabilities 121 and communication network 122, and device domain 130 may include M2M device 131, M2M gateway 132, and M2M devices 133 and 134.

Application domain 110 may be connected to M2M devices 131, 133, and 134 through network domain 120. For example, server 111 may collect information from a plurality of vehicles, analyze driving patterns thereof based on the collected information, weather information, and traffic information, and provide safe driving information to a target vehicle when detecting an abnormal driving pattern based on the analysis result.

Network domain 120 may couple M2M devices 131, 133, and 134 to application domain 110 for data communication. In case of a M2M network, network domain 120 may include access/core network 122 and service capabilities 121. Service capabilities 122 may form the interface between access/core network 121 and server 111.

Device domain 130 may include plurality of M2M devices, for example, M2M devices 131, 133, and 134 coupled to application domain 110. Such M2M devices may be classified into direct communication type M2M device 131 and indirect communication type M2M devices 133 and 134. Direct communication type M2M device 131 may be coupled directly to M2M network, for example, network 122. Indirect communication type M2M devices 133 and 134 may be coupled to M2M network through M2M gateway 132.

In accordance with at least one embodiment, M2M devices 131, 133, and 134 may be a terminal installed at each vehicle for sensing and collecting various types of information of a vehicle and transmit the sensed and collected information to server 111. Particularly, M2M devices 131, 133, and 134 are installed at each vehicle and senses and collect various types of information that might influence the cruising of each vehicle. M2M devices 131, 133 and 134 transmit, in real time, such information to server 111 through network 122. Server 111 receives such information from M2M devices 131, 133, and 134 through network domain 120. The collected information may include vehicle information, weather information, and traffic information. Server 111 analyzes each vehicle's driving pattern and determines correlation between the collected information from vehicles and associated traffic flows. Server 111 generates an abnormal driving pattern model based on the determined correlation. Such abnormal pattern model may be used as traffic flow analysis. Furthermore, server 111 may identify a vehicle having a driving pattern matched with the abnormal driving pattern model based on information collected from M2M devices 131, 133, and 134, and server 111 may define the identified vehicle as a target vehicle to manage or to control. Based on such analysis result, server 111 may provide safe driving information and velocity matching information to the target vehicle for collision avoidance in accordance with at least one embodiment.

As described, server 111 may provide safe driving information to at least one of vehicles for safe driving and collision avoidance. Furthermore, server 111 may control at least one vehicle for safe driving and collision avoidance. Hereinafter, such server 111 will be described in more detail with reference to FIG. 2.

Figure 2:
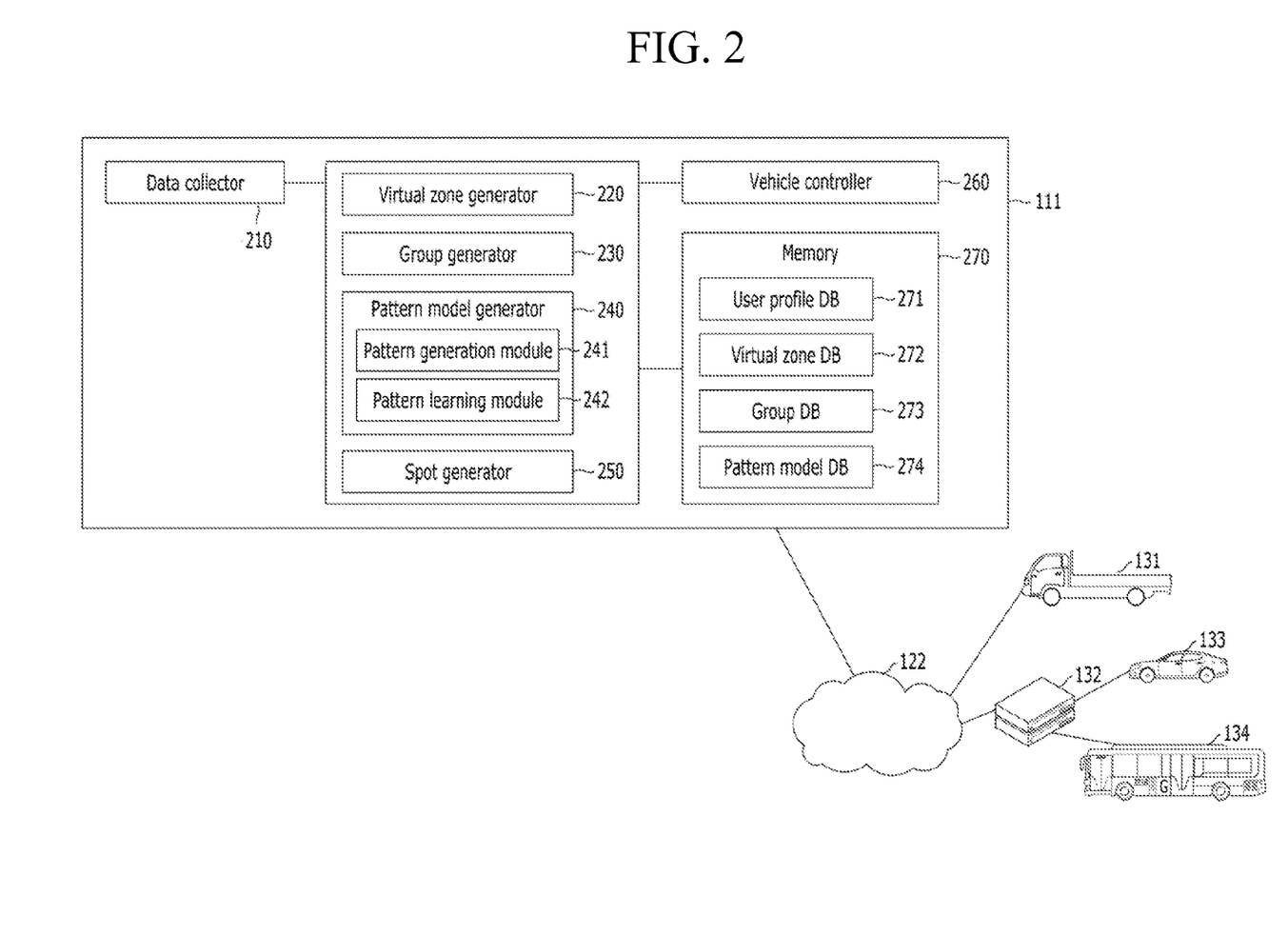
FIG. 2 shows a server of assisting, managing, and controlling driving vehicles in motion in accordance with at least one embodiment of the present invention.

FIG. 2 shows a server of assisting, managing, and controlling driving vehicles in motion in accordance with at least one embodiment of the present invention.

Referring to FIG. 2, server 111 may include data collector 210, virtual zone generator 220, group generator 230, pattern model generator 240, spot generator 250, vehicle controller 260, and memory 270. Data collector 210 may collect various types of information from vehicles in motions and related servers such as a weather service server, and a traffic control server. The information may include vehicle information, user profile informant, driving context information, weather information, road condition information, and traffic information. Data collector 210, virtual zone generator 220, group generator 230, pattern model generator 240, spot generator 250, and vehicle controller 260, and memory 270 may include one or more processor devices/logic, memory, program code, input/output (I/O) and related circuitry to implement the described functionality in a physical device.

Virtual zone generator 220 may define at least one of the virtual zones based on the collected information. Such virtual zones may vary according to real-time traffic flow. Group generator 230 may group vehicles entering a virtual zone as a vehicle group if the vehicles have similarities matched with predetermined similarity conditions. Pattern model generator 240 may analyze a driving pattern of each vehicle in each vehicle group based on the collected information and model an abnormal driving pattern of vehicle group based on the analysis result.

Spot generator 250 may designate at least one specific area of each virtual zone as a spot. That is, spot generator 250 may detect, per each vehicle group, at least one vehicle having driving patterns matched with the abnormal driving pattern model and designate an area of the detected vehicle as a spot. That is, spot generator 250 may detect an area where at least one vehicle having a driving pattern matched with the abnormal driving pattern model is and designate the detected area as a spot. Vehicle controller 260 may detect vehicles having a driving pattern matched with attributes of spots. Vehicle controller 260 may generate safe driving information and/or vehicle control information and transmit the safe driving information and/or vehicle control information to the detected vehicles.

Memory 270 may store various types of information collected from a plurality of vehicles or associated servers such as a weather service server or a traffic control server. Such collected information may include vehicle information, user profile information, driving context information, road condition information, weather information, traffic information, and so forth. Memory 270 may further store processing and analysis results of the above constituent elements. Such processing and analysis result information may include information on virtual zones, driving patterns, abnormal driving pattern models, spots, vehicle groups, and so forth. In order to store such various types of information, memory 270 may further include user profile database (DB) 271, virtual zone DB 272, group DB 273, and pattern model DB 274. User profile DB 271 may store user profile information collected from each vehicle. Virtual zone DB 272 may store information on at least one generated virtual zone. Group DB 273 may store information on at least one vehicle group. Pattern model DB 274 may store information on at least one abnormal driving pattern model.

Hereinafter, each constituent element of server 111 will be described in more detail. Data collector 210 may collect, in real-time, driving context information of each vehicle and associated user profile information from vehicles through machine to machine (M2M) communication. Furthermore, data collector 210 may collect, in real-time, weather information, traffic information, and driving context information such as road condition from at least one of related servers such as a weather server or a traffic control server.

Virtual zone generator 220 may define at least one virtual zone in consideration of temporal correlation and spatial correlation of vehicles in motion from the collected information including vehicle information, traffic information, weather information, and driving context. The virtual zone may denote a target geographical area for assisting, managing, or controlling driving of vehicles that passes thereby. When a particular geographical area has attributes matched with predetermined vehicle management conditions, such geographical area is defined as a virtual zone. The virtual zone may be defined and eliminated based on driving contexts collected in real time from vehicles passing on an associated geographical area. Furthermore, a size and a shape of the virtual zone may be changed and updated based on the driving contexts thereof.

Information on at least one virtual zone may be stored in virtual zone DB 272 with associated supplementary information such as a corresponding geographical location and a defining time. Such information is stored in real time and updated in real time.

Group generator 230 may group vehicles having correlation based on the collected vehicle information and user profile information from data collector 210. That is, group generator 230 may determine similarities among vehicles from the collected information and group vehicles having similarities matched according to predetermined conditions. For example, group generator 230 detects vehicles having predetermined similarities based on the related user profiles among vehicles enter a virtual zone. Group generator 230 groups the determined vehicles as the same vehicle group. In this way, group generator 230 may generate at least one vehicle group. The predetermined similarities for detecting vehicles for the same group may include the same vehicle type, the same manufacturing years, the similar driver age, the same sex, and the same service used.

User profile information may include vehicle information and driver information. The vehicle information may be information about a vehicle and the driver information may be information on a driver. The vehicle information may include a vehicle type, a vehicle manufacturing year, a year of using, vehicle attributes, and so forth. The driver information may include identifier (ID), subscribed services, sex, age, driving history and so forth. Group generator 230 may retrieve user profile information collected from data collector 210 or profile DB 217. The information on the generated group may be stored in group DB 273. The group information may be stored in real time and updated in real time.

Pattern model generator 240 may obtain a driving pattern of each vehicle based on vehicle information collected by data collector 210. Pattern model generator 240 may analyze the obtained driving patterns of the vehicles by comparing them with others. Pattern model generator 240 may find abnormal driving pattern of each vehicle based on the analysis result and generate at least one abnormal driving pattern model by generalizing such abnormal driving patterns.

Pattern model generator 240 may include pattern generating module 241 and pattern update module 242. Pattern generating module 241 may generate at least one abnormal driving pattern model as described above. Pattern update module 242 may improve the accuracy of an abnormal driving pattern model through learning. Pattern update module 242 might be necessary because server 111 collects information from vehicles in motion. Such collected information may be dynamically changed in real time. Pattern update module 242 continuously analyzes driving patterns of vehicles. When pattern update module 242 generates a new abnormal driving pattern model based on the analysis result or when pattern update module 242 newly detects a driving pattern changed above a predetermined threshold value, pattern update module 242 updates the abnormal driving pattern model based on the newly detected driving pattern. Pattern model generator 240 may store information on the generated abnormal pattern models at pattern model DB 274.

Spot generator 250 may determine whether vehicles entering an associated virtual zone have driving patterns matched with the abnormal driving pattern model. Spot generator 250 may designate areas where such determined vehicles are located as a spot. Accordingly, each virtual zone may include at least one of spots or no spot. Furthermore, spot generator 250 may maintain or eliminate the generated spots according to information collected from vehicles passing through an associated virtual zone, which is changed dynamically in time.

Particularly, spot generator 250 may maintain the generated spot if vehicles cause the same driving context which is a driving pattern matched with the generated abnormal driving pattern model when the vehicles pass a spot. For example, spot generator 250 generates a spot if a first vehicle has a driving pattern matched with a generated abnormal cruising pattern model when the first vehicle passes through a location of the spot in an associated virtual zone. Spot generator 250 maintains such spot if a second vehicle belonging to the same vehicle group of the first vehicle has the same driving pattern when the second vehicle passes through the same spot of the first vehicle. Furthermore, spot generator 250 eliminates the spot when the second vehicle does not cause the same driving pattern when the second vehicle passes the same spot.

In addition, spot generator 250 stores information on spots in connection with virtual zone information in virtual zone DB 272 and updates the stored information on spots according to variation of the spots and associated virtual zones.

Vehicle controller 260 may analyze influence of a spot to vehicles entering an associated virtual zone and generating information based on the analysis result for safe driving for vehicles passing the spot. For example, vehicle controller 260 may determine whether a vehicle entering into or locating in an associated virtual zone produce driving patterns matched with attributes of corresponding spots. Vehicle controller 260 may generate safe information or vehicle control information and transmit them to the determined vehicles. Furthermore, vehicle controller 260 may generate velocity matching information based on the analysis result in order to control vehicles passing surrounding areas of the spot. Based on the velocity matching information, vehicles may be driven in the same speed for collision avoidance. In this case, server 111 may transmit the generated safe driving information and the velocity matching information to a M2M device installed at corresponding vehicles in order to warn a driver thereof. Such information may be transmitted as a warning message or an alarm message.

Vehicle controller 260 may directly control vehicles equipped with a M2M device having a remote control application. In this case, vehicle controller 260 may detect a vehicle influenced by a spot and directly control the detected vehicle around the spots by transmitting a control signal to the detected vehicle.

As described, server 111 may provide safe information or control signals to vehicles having abnormal driving patterns when vehicles pass through a corresponding virtual zone in accordance with at least one embodiment. Such operation will be described in more detail with reference to FIG. 3.

Figure 3:
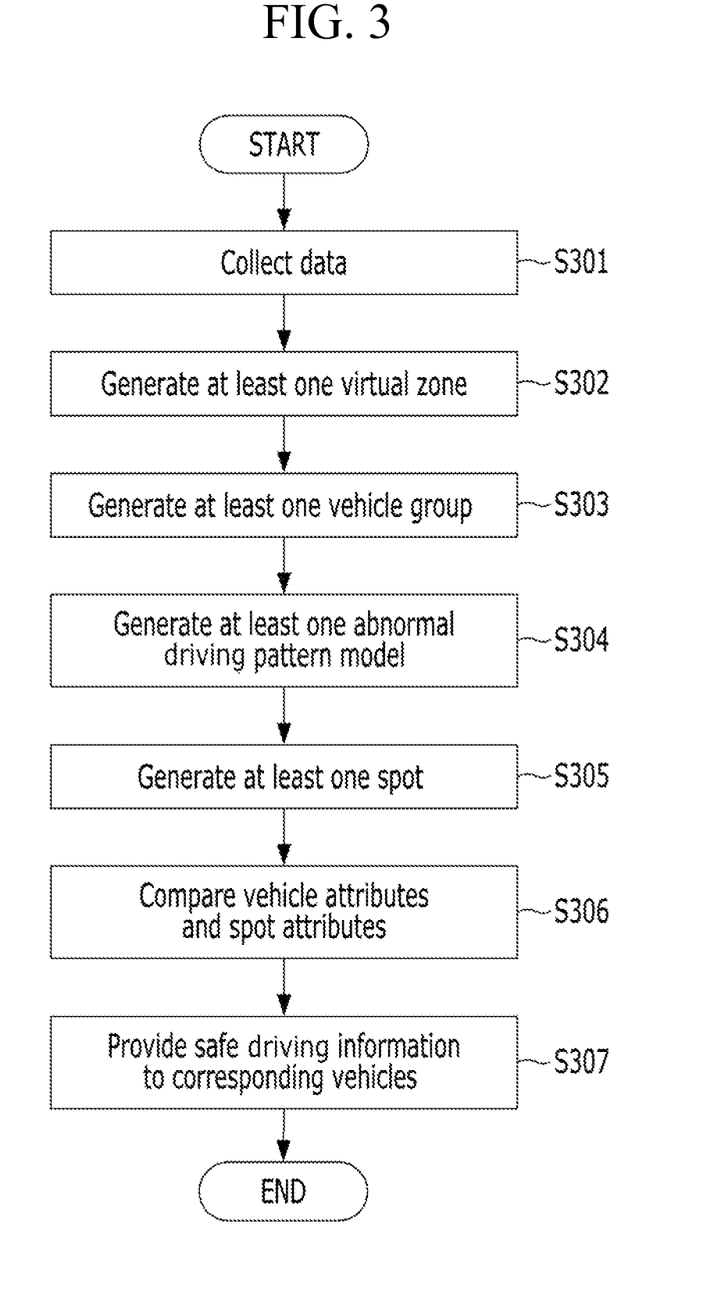
FIG. 3 shows a method of assisting, managing, and controlling driving a vehicle according to driving context of surrounding vehicles in accordance with at least one embodiment of the present invention.

FIG. 3 shows a method of assisting, managing, and controlling driving a vehicle according to driving context of surrounding vehicles in accordance with at least one embodiment of the present invention.

Referring to FIG. 3, a vehicle in motion may be assisted, managed or controlled through sensing changes in driving contexts of surrounding vehicles as described above. Such assistance, management, and control may include at least one of a data collection procedure (S301), a virtual zone generation procedure (S302), a vehicle grouping procedure (S303), a pattern modeling procedure (S304), a spot designation procedure (S305), a target vehicle searching procedure (S306), and an assistance and control procedure (S307) in accordance with at least one embodiment.

In the data collection procedure (S301), various types of information may be collected from at least one of a plurality of vehicles in motion and associated servers coupled to a related communication network, such as a weather service server, and a traffic control server. Such information may include vehicle information, user profile information, driving context information, weather information, road condition information, and traffic information.

In the virtual zone generation procedure (S302), at least one of virtual zones may be defined based on the collected information. In the vehicle grouping procedure (S303), vehicles entering the generated virtual zone may be grouped as a vehicle group if the entering vehicles have similarities based on the collected information such as vehicle information and user profile information. That is, when the entering vehicles have attributes matched with predetermined similarity conditions, those vehicles are grouped together as the same vehicle group.

In the pattern modeling procedure (S304), a driving pattern of each vehicle in each vehicle group may be analyzed based on the collected information and an abnormal driving pattern of each vehicle group may be modeled based on the analysis result. In the spot designation procedure (S305), per each vehicle group, determination may be made as to whether at least one vehicle has driving pattern matched with the abnormal driving pattern model and a location of the determined car may be designated as a spot. In the target vehicle searching procedure (S306), a target vehicle may be selected based on attributes of the spot. In the assistance and control procedure (S307), safe driving information may be provided to the target vehicle or the target vehicle may be controlled.

Hereinafter, each procedure will be described in detail with reference to a flowchart of FIG. 3. Referring to FIG. 3, various types of information may be collected from at least one of a plurality of vehicles in motion and associated servers coupled through a related communication network at step S301.

For example, data collector 210 of server 111 collects various types of information. Such collected information may include vehicle information, user profile information, driving context information, weather information, road condition information, and traffic information. Particularly, data collector 210 collects information related to driving context of each vehicle and a user profile of each vehicle directly from a plurality of vehicles in motion. Data collector 210 also collects weather information, traffic information, and road condition information from related servers such as a weather service server and a traffic control server. Such information may be collected in real time through M2M communication in accordance with at least one embodiment.

Data collector 210 may obtain such information from memory 270 of server 111. That is, data collector 210 may obtain driving context information, vehicle information, and user profile information by analyzing information stored in memory 270. Alternatively, data collector 210 may simply read driving context information, vehicle information, user profile information, weather information, road condition information, and traffic information from memory 270.

Such a data collection procedure (S301) may include a filtering procedure. That is, the collected information may be filtered to eliminate noise information during the step S301. Particularly, the collected information is classified into essential information and noise information. The noise information may denote information that is unnecessary to manage and control a vehicle and might cause errors during analyzing the collected information. The essential information may denote information necessary for assisting, managing, and controlling a vehicle. The essential information may include personal information, vehicle information, driving information, weather information, traffic information, accident information, construction information, road condition information, and surrounding context information, but the present invention is not limited thereto. The essential information including vehicle information and driving context information may be sensed through various sensors equipped in a vehicle. Table 1 below shows various types of information collected from corresponding sensors.

| Sensors installed in a vehicle | Sensed information |
| --- | --- |
| Driving power related sensors | Revolutions Per Minute (RPM), transmission set-ups, throttle position, coolant temperature, oil temperature, tire pressure, and so forth. |
| Driving assistance related sensors | Stop signal lights, turning signal lights, headlights, taillights, wiper, door lock, interior temperature, fuel level, velocity, location, time, date, direction, and so forth |
| Safety feature related sensors | Airbag signal, antilock brake system (ABS), seatbelt, anti-thief, and so forth. |
| Other sensors | time, date, radio broadcasting signal, and so forth |

As described, the data collection procedure (S301) is described as being performed before the other procedures (S302 to S306). The present invention, however, is not limited thereto. The data collection procedure may be also performed parallel with other procedures (S302 to S306) because the other procedures (S302 to S306) may require real-time information from vehicles and related servers.

At step S302, at least one virtual zone may be defined based on the collected information. Such a virtual zone may be dynamically changed according to traffic flows which are also dynamically changed in real time. For example, virtual zone generator 220 of server 111 determines at least one geographical area to be assisted, managed, or controlled in consideration of temporal and spatial correlations of vehicles based on the collected information including the vehicle information, the driving information, the road condition information, and the weather information. As described, the virtual zone may be a target geographical area for assisting, managing, or controlling vehicles that pass thereon. That is, the virtual zone may be a geographical area having attributes matched with predetermined vehicle management conditions.

The virtual zone is defined based on information that is dynamically changed in time. Such information may include information on road attributes, traffic conditions, weather conditions, and vehicle information. That is, such time-variable information may be different by a time of collection. Accordingly, the virtual zone is constantly generated, modified, and eliminated according to a driving state of a vehicle. After generation, information on at least one generated virtual zone is stored in memory 270 together with a generation time and an associated geographical area. Furthermore, the stored information on the virtual zones is also updated regularly.

At step S303, vehicles entering the generated virtual zone and having predetermined similarities may be grouped into at least one vehicle group based on the collected information. For example, group generator 230 of server 111 finds correlation among vehicles entering the generated virtual zone based on the vehicle information and the user profile information thereof. That is, similarities among vehicles are determined based on the vehicle information and the user profile information of the vehicles entering the generated virtual zone. Such similar vehicles are grouped together as the same vehicle group.

For example, at least one of similarities among drivers, similarities among vehicles, similarities among drivers and vehicles are determined based on the collected information such as the vehicle information and the user profile information. Based on the determination result, similar vehicles are grouped together as the same vehicle group. Particularly, information for the similarities in drivers and vehicles may include a type of a vehicle, a manufacturing year of a vehicle, a purpose of a vehicle, functions of a vehicle, a driver age, a driver sex, and so forth. Such a group generation procedure S303 will be described in more detail with reference to FIG. 4.

At step S304, a driving pattern of each vehicle in each vehicle group may be analyzed based on the collected information and an abnormal driving pattern of each vehicle group may be modeled based on the analysis result. For example, pattern model generator 240 may obtain a driving pattern of each vehicle in each vehicle group based on the collected vehicle information. Pattern model generator 240 may analyze and compare the obtained driving patterns with others, and generate an abnormal cruising pattern model based on the analysis result. Such an abnormal driving pattern modeling procedure (S304) will be described in more detail with reference to FIG. 5.

At step S305, per each vehicle group, determination may be made so as whether at least one vehicle has driving pattern matched with the abnormal driving pattern model and a location of the determined car may be designated as a spot. For example, spot generator 250 designates, as a spot, a predetermined area where vehicles entering the virtual zone have a driving pattern matched with the generated abnormal driving pattern model based on the collected vehicle information.

Such a spot may be defined within a predetermined distance from a location of a vehicle having the matched abnormal driving pattern according to a location and a time of the vehicle. At least one spot may be defined in a virtual zone according to traffic flows and driving patterns of related vehicles or no spot may be defined. In addition, such spots may be repeatedly generated and eliminated according to traffic flows and driving patterns of related vehicles. Such a spot designation and update procedure (S305) will be described in more detail with reference to FIG. 6.

At step S306, vehicle controller 260 may determine whether a vehicle entering an associated virtual zone or a vehicle locating in the associated virtual zone produce driving patterns matched with attributes of corresponding spots. For example, in order to make such determination, vehicle controller 260 determines whether dangerous factors of spots influence to driving of vehicles passing the spots, what is a speed of a vehicle when the vehicle passes the spot, and whether a vehicle avoids spots when the vehicle drives through a corresponding virtual zone.

According to the analysis result, vehicle controller 260 may generate safe driving information or a control signal and transmit the generated safe information of the control signal to vehicles having driving patterns matched with attributes of spots at step S307.

The safe driving information may include warning messages or alarm messages. Warning or alarm message may be messages for helping or assisting a driver to drive in a manner for collision avoidance. Such warning or alarm message may include a message for a proper speed in a spot, a request for matching a speed with other vehicles in the same virtual zone, a traffic condition in a spot, a weather condition in a spot, or a road condition in a spot. Furthermore, such message may be filtered by a driver or by a driving context of each vehicle.

The control signal may be a signal for remotely controlling a vehicle by server 111. In order to remotely control a vehicle, a user authentication procedure may be performed. The control signal may include information for controlling features and functions of a target vehicle, for example, speed, steering, safe features, and so forth.

As described above, vehicles entering an associated virtual zone may be grouped together as a vehicle group when vehicles have similarities in accordance with at least one embodiment. That is, when vehicle entering an associated virtual zone have attributes matched with predetermined similarity conditions, such vehicles are grouped together as the same vehicle group. Such a group generation procedure (S303) will be described in more detail with reference to FIG. 4.

Figure 4:
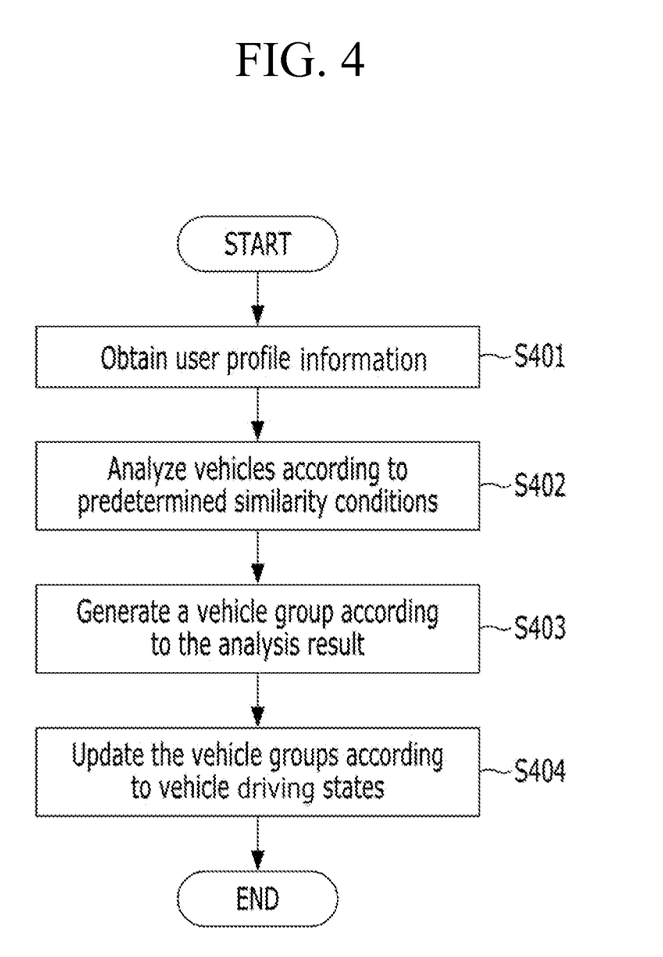
FIG. 4 shows vehicle grouping in accordance with at least one embodiment of the present invention.

FIG. 4 shows vehicle grouping in accordance with at least one embodiment of the present invention.

Referring to FIG. 4, group generator 230 may obtain user profile information based on information collected from a plurality of vehicles entering an associated virtual zone at step S401. Such user profile information may be included in vehicle information. Or, the user profile information may be generated based on vehicle information or directly read from user profile DB 271.

After obtaining the user profile information of each vehicle entering the associated virtual zone, group generator 230 may analyze at least one of similarities in vehicles, similarities in drivers, and similarities in vehicles and drivers based on the collected user profile information at step S402. Group generator 230 may generate at least one vehicle group by grouping a plurality of vehicles based on the analysis result at step S403. For example, vehicles having the similarities are grouped together as the same vehicle group based on the analysis result.

At step S404, group generator 230 may update the generated vehicle groups based on vehicle information which is dynamically changed in time. For example, after generating at least one vehicle group, vehicles may leave from an associated virtual zone or may enter a new virtual zone. In this case, an associated vehicle group may be required to be updated. Accordingly, group generator 230 may monitor the collected information regularly and update associated vehicle groups based on the monitoring result. Information on the vehicle groups may be stored and updated in memory 270.

As described, an abnormal driving pattern model is generated based on driving patterns of vehicles in each vehicle group. Such an abnormal driving pattern modeling procedure will be described in more detail with reference to FIG. 5.

Figure 5:
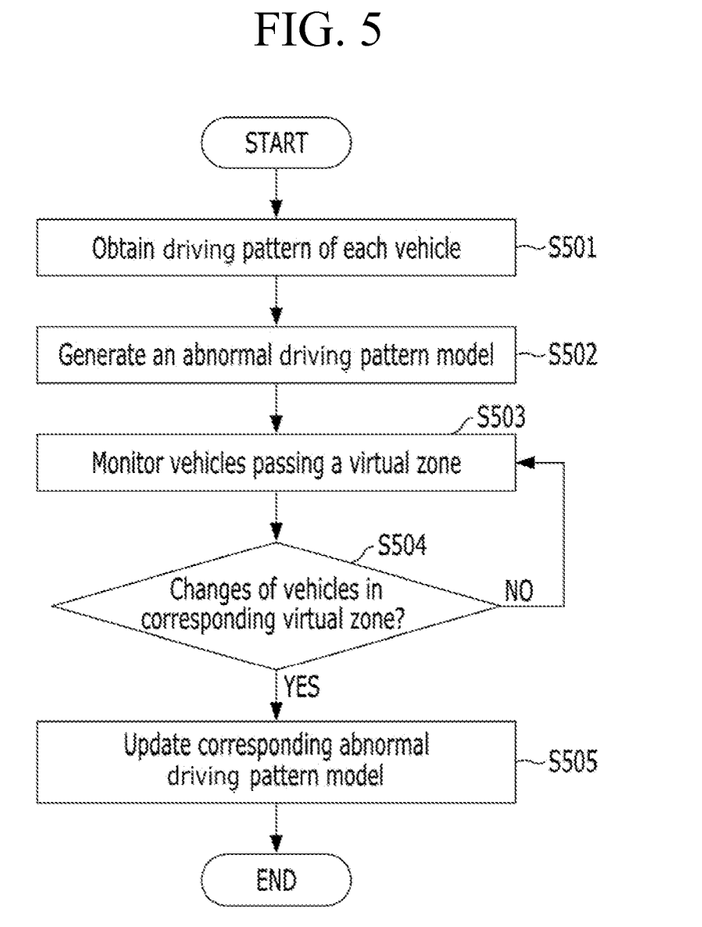
FIG. 5 shows abnormal driving pattern modeling in accordance with at least on embodiment of the present invention.

FIG. 5 shows abnormal driving pattern modeling in accordance with at least on embodiment of the present invention.

Referring to FIG. 5, pattern model generator 240 may analyze various types of information collected from vehicles in each vehicle group and determine a driving pattern of each vehicle based on the analysis result at step S501.

At step S502, pattern model generator 240 may generate an abnormal driving pattern model based on the determined driving patterns. For example, pattern model generator 240 may analyze and compare the determined driving patterns with others and find abnormal driving patterns based on the analysis and comparison results. Pattern model generator 240 may generalize such abnormal driving patterns and generate an abnormal driving pattern model based on the generalization result. Such abnormal driving pattern model may be obtained using correlation between vehicle information of each vehicle and traffic flows thereof.

Server 111 collects information from vehicles in motion in real time and analyzes a driving pattern based on the collected data. The abnormal driving pattern may be changed according to various types of conditions. Accordingly, an update procedure may be performed for elaborating an abnormal pattern model.

For example, at step S503, vehicles associated with abnormal driving pattern models are continuously monitored. While monitoring, determination may be performed so as whether vehicle information thereof is changed at step S504. For example, pattern model generator 240 continuously monitors vehicles associated with an abnormal cruising patter model and determines whether the monitored vehicles leave a related virtual zone or enter a new virtual zone.

When the vehicle information thereof is changed (Yes—S504), an associated abnormal cruising patter model is updated based on the changed vehicle information at step S504. Otherwise (No—S504), vehicles associated with the abnormal driving pattern modes are continuously monitored.

As described above, an area of a vehicle producing a driving pattern matched with an abnormal driving pattern model may be defined as a spot. Such a spot may be updated according to information collected from vehicles in real time. Such a spot designation and update procedure will be described in more detail with reference to FIG. 6.

Figure 6:
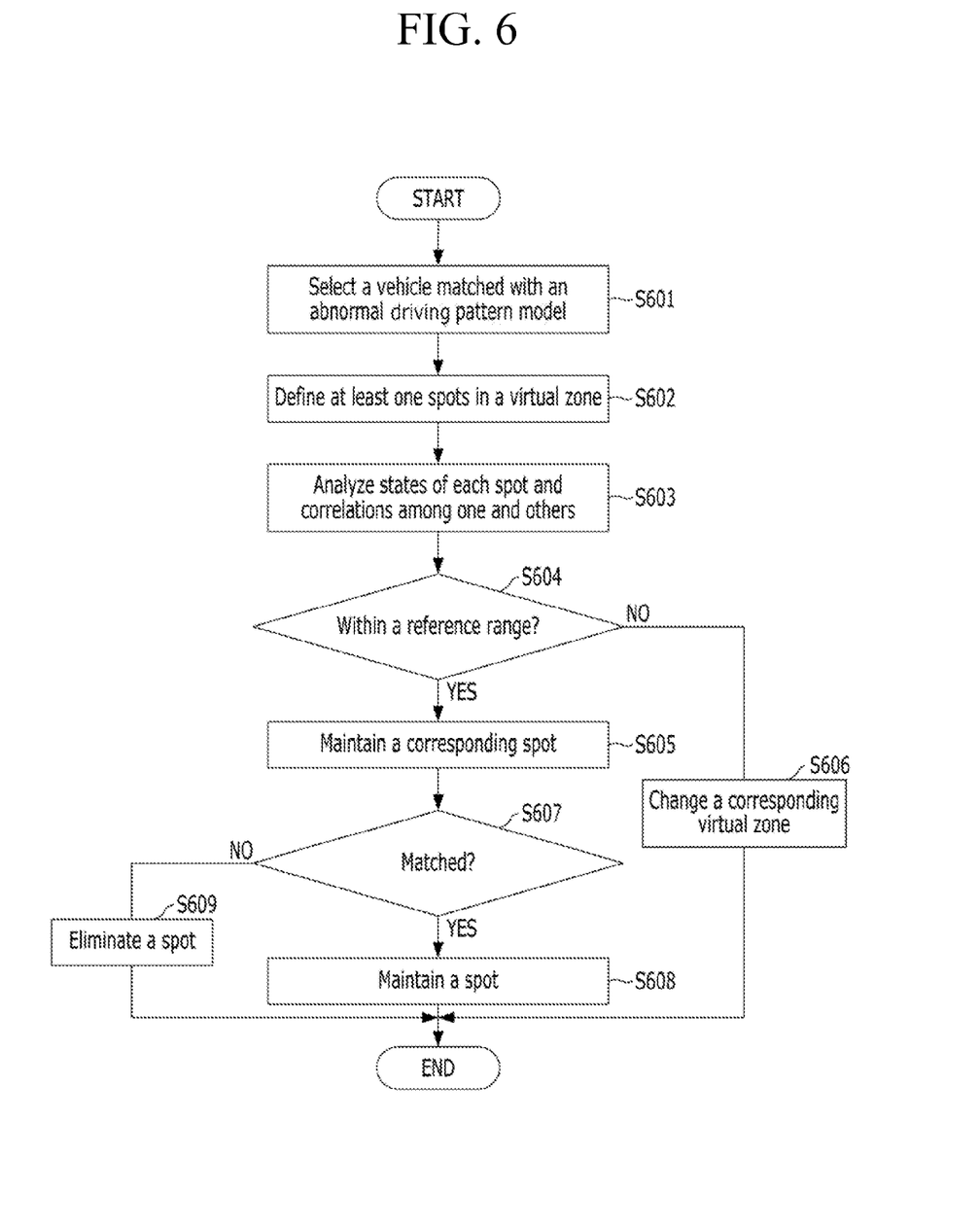
FIG. 6 shows spot designation and update in accordance with at least one embodiment of the present invention.

FIG. 6 shows spot designation and update in accordance with at least one embodiment of the present invention.

Referring to FIG. 6, spot generator 250 may analyze information collected from vehicles entering an associated virtual zone and detect vehicles producing a driving pattern matched with an abnormal driving pattern model based on the analysis result at step S601. Upon the detection, spot generator 250 may designate an area of the detected vehicle as a spot in consideration of temporal information and spatial information of the detected vehicles at step S602.

At step S603, spot generator 250 may analyze and compare attributes of the generated spots to each other and determine whether the analyzed attributes are included within a corresponding reference range. For example, as described, a virtual zone may include a plurality of spots. Such spots are analyzed in sizes, locations, and densities. That is, such attributes of spots may be compared with corresponding reference range.

When such attributes are included within the corresponding reference ranges (Yes—S604), the generated spots may be maintained and a corresponding virtual zone may be maintained at step S605. Otherwise (No—S604), analysis and comparison results may be provided for updating a corresponding virtual zone at step S606. For example, when a density of spots in a virtual zone is greater than a highest value of a corresponding reference range, the corresponding virtual zone may be enlarged. Or, when the density of spots in a virtual zone is smaller than a lowest value of the corresponding reference range, the virtual zone is contracted or divided into two virtual zones.

At step S607, spot generator 250 may continuously analyze information collected from vehicles passing the spots and determine whether the vehicles produce driving patterns matched with attributes of the spots.

When the passing vehicles produce the driving patterns matched with the attributes of the spots (Yes-S607), the spots may be maintained at step S608. Otherwise (No-S609), the spots may be eliminated at step S609. For example, spot generator 250 generates a spot if a first vehicle has a driving pattern matched with a generated abnormal cruising pattern model when the first vehicle passes through a location of the spot in an associated virtual zone. Spot generator 250 maintains such spot if a second vehicle belonging to the same vehicle group of the first vehicle has the same driving pattern when the second vehicle passes through the same spot of the first vehicle. Furthermore, spot generator 250 eliminates the spot when the second vehicle does not cause the same driving pattern when the second vehicle passes the same spot.

Such steps S607 to S609 may be performed for determining how spots influence safe driving of vehicles passing through those spots. Accuracy thereof may be adjusted according to times of analyzing and comparing attributes of spots with those of vehicles passing thereby.

Figure 7:
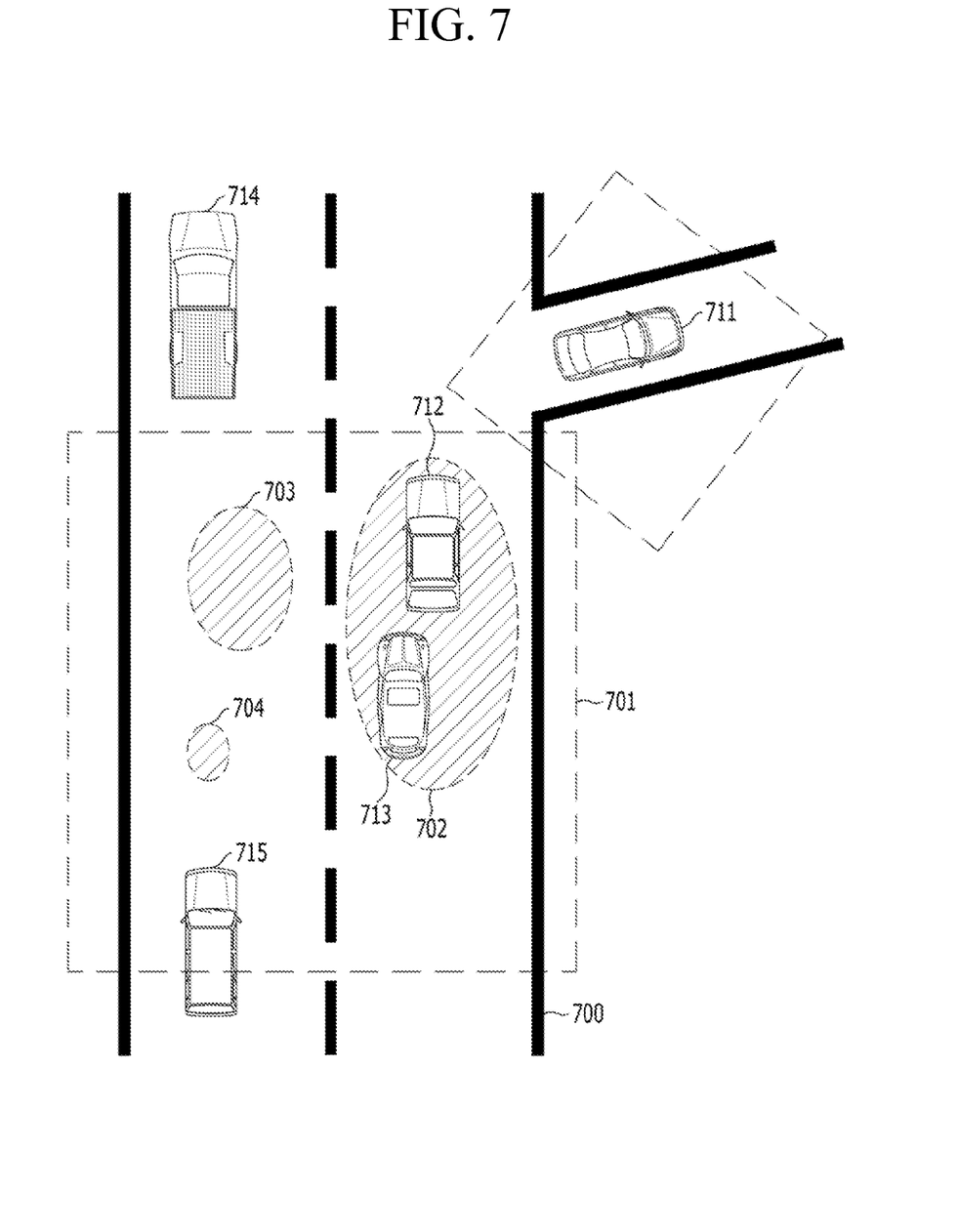
FIG. 7 shows examples of assisting, managing, and controlling vehicles in accordance with at least one embodiment of the present invention

FIG. 7 shows examples of assisting, managing, and controlling vehicles in accordance with at least one embodiment of the present invention.

Referring to FIG. 7, server 111 collects information from vehicles and related servers and defines virtual zone 701 based on the collected information. Such collected information may include vehicle information, user profile information, driving context information, weather information, traffic information, road condition information, and so forth. Server 111 detects vehicles entering virtual zone 701 and having driving patterns matched with an abnormal driving pattern model and designates areas of the detected vehicles as spots 702, 703, and 704.

Vehicles entering or in virtual zone 701 may be grouped to at least one vehicle groups, such as a first group and a second group, based on vehicle information and user profile information. That is, vehicles having predetermined similarities may be grouped together as the same vehicle group. For example, vehicles 711, 712, and 713 may be grouped to the first group. Vehicles 714 and 715 may be grouped to the second group.

First spot 702 may be defined based on the first vehicle group. Second spot 703 and third spot 704 may be defined based on the second vehicle group.

Vehicles belonging to the same vehicle group have substantially same attributes. Accordingly, vehicles in the same vehicle group provide similar or same driving patterns when the vehicles pass the same spots. For example, second vehicle 712 and third vehicle 713 are included in the same vehicle group. Accordingly, second vehicle 712 and third vehicle 713 have the same driving pattern when second vehicle 712 and third vehicle 713 pass the same spot, first spot 702.

However, actual driving patterns of vehicles in the same vehicle group may be different. Accordingly, in first spot 702, second vehicle 712 has driving pattern different from that of third vehicle 713. When such difference is greater than a predetermined threshold, one of second vehicle 712 and third vehicle 713 may be removed from the first vehicle group. That is, one having less influence from spot 702 may be removed from the first vehicle group.

Vehicle grouping was described as grouping vehicles in the same virtual zone. However, the present invention is not limited thereto. Vehicles may be grouped based on various attributes of vehicles and associated services. For example, vehicles may be grouped based on a service associated with vehicles. For example, vehicles associated with the same service such as a city tour or a car sharing service. When vehicles are grouped based on the associated service thereof, such vehicles may be continuously managed as the same vehicle group regardless of driving paths thereof. Furthermore, one vehicle may be included in multiple vehicle groups. In this case, a service based group may have a higher priority than that of a virtual zone based on group.

In case of the service based group, when first vehicle 711, second vehicle 712, and third vehicle 713 are associated with the same service, first vehicle 711, second vehicle 712, and third vehicle 713 are grouped as the same vehicle group. In this case, although first vehicle 711 leaves virtual zone 701, first vehicle 711 is still included in the same vehicle group with second and third vehicles 712 and 713.

As shown in FIG. 7, fourth and fifth vehicle 714 and 715 are included in the same second vehicle group. Fourth vehicle 714 leaves virtual zone 701 and fifth vehicle 715 enters virtual zone 701. Although fifth vehicle 715 enters virtual zone 701, there is no vehicle included in the same vehicle zone with fifth vehicle 715 because fourth vehicle 714 left virtual zone 701. However, server 111 may provide safe information related to spots 703 and 704 to fifth vehicle 715 based on information on fourth vehicle 174 which was included in the same vehicle group.

For example, a driver might be in a dangerous situation if the driver is not informed with weather information such as local foggy area or isolated storm or heavy rain. In this case, server 111 may provide safe driving information to a vehicle newly entering a virtual zone based on information collected vehicles in the same vehicle group but left the virtual zone in past time such as few seconds, minutes, or hours.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing and controlling vehicles for safe driving, the method comprising:
   collecting information from a plurality of vehicles in motion and related servers in real time;
   defining at least one virtual zone based on the collected information;
   grouping vehicles into at least one vehicle group according to a predetermined similarity condition based on the collected information;
   generating an abnormal driving pattern model based on a driving pattern of each vehicle in each vehicle group;
   designating at least one area of a virtual zone as a spot when at least one vehicle having a driving pattern matched with the abnormal driving pattern model is in the at least one area; and
   transmitting safe driving information to at least one vehicle having driving patterns matched with attributes of the spot among vehicles entering each virtual zone.

2. The method of claim 1, wherein the collected information includes vehicle information, user profile information, weather information, traffic information, road condition information, accident information, and construction information.

3. The method of claim 1, wherein:
   the collecting the information includes continuously collecting and updating the information from the plurality of vehicles in motion and the related servers; and
   modifying or eliminating the at least one defined virtual zone according to the continuously collected and updated information.

4. The method of claim 1, wherein:
   the at least one defined virtual zone is a target geographical area for managing and controlling vehicles passing through the target geographical area; and
   the target geographical area has attributes matched with predetermined management conditions.

5. The method of claim 1, wherein the grouping vehicles includes:
   detecting vehicles having similarities matched with the predetermined similarity condition based on vehicle information and user profile information obtained from the collected information; and
   grouping the detected vehicles as a same vehicle group.

6. The method of claim 5, wherein the predetermined similarity condition includes at least one of similarities between drivers, similarities between vehicles, and similarities between drivers and vehicles.

7. The method of claim 1, wherein the grouping vehicles includes:
grouping vehicles entering into or locating in a virtual zone to at least one vehicle group according to the predetermined similarity condition.

8. The method of claim 1, wherein the grouping vehicles includes:
updating the at least one vehicle group when at least one of associated vehicles leaves the virtual zone and when at least one vehicle having the predetermined similarities enters the virtual zone.

9. The method of claim 1, wherein the generating an abnormal driving pattern model includes:
obtaining driving patterns of vehicles in each vehicle group based on the collected information;
analyzing the obtained driving patterns by comparing a driving pattern of one vehicle with others and finding abnormal driving patterns among the obtained driving patterns; and
modeling the abnormal driving patterns based on the analysis result to generate the abnormal driving pattern model for each vehicle group.

10. The method of claim 9, wherein the generating an abnormal driving pattern model includes:
updating the generated abnormal driving pattern model of each vehicle group by repeatedly performing the obtaining the driving patterns, the analyzing the obtained driving patterns, and the modeling the abnormal driving patterns.

11. The method of claim 1, wherein the spot is generated, modified, and eliminated according to at least one of movements of vehicles, road conditions, weather conditions, and constructions in a corresponding virtual zone.

12. The method of claim 1, wherein the designating at least one area of a virtual zone as a spot includes:
analyzing correlation between one spot with others in an associated virtual zone; and
updating the associated virtual zone based on the analysis result.

13. The method of claim 1, wherein the designating at least one area of a virtual zone as a spot includes:
collecting information from vehicles passing through the generated spot;
maintaining the generated spot when the vehicles have driving patterns matched with attributes of the generated spot based on the collected information;
eliminating the generated spot when the vehicles have no driving patterns matched with attributes of the generated spot based on the collected information.

14. The method of claim 1, wherein the safe driving information includes velocity matching information for synchronizing speeds of vehicles associated with a same vehicle group or associated with a same spot.

15. A server of managing and controlling vehicles for safe driving, the server comprising:
a virtual zone generator configured to define at least one virtual zone based on information collected from a plurality of vehicles in motion and related servers in real time;
a vehicle group generator configured to group vehicles into at least one vehicle group according to a predetermined similarity condition based on the collected information;
a pattern model generator configured to generate an abnormal driving pattern model based on a driving pattern of each vehicle in each vehicle group;
a spot generator configured to designate at least one area of a virtual zone as a spot when at least one vehicle having a driving pattern matched with the abnormal driving pattern model in the at least one area; and
a vehicle controller configured to transmit safe driving information to at least one vehicle having driving patterns matched with attributes of the spot among vehicles entering each virtual zone.

16. The server of claim 15, wherein the vehicle group generator is configured to:
detect vehicles having similarities matched with the predetermined similarity condition based on vehicle information and user profile information obtained from the collected information; and
group the detected vehicles as a same vehicle group.

17. The server of claim 15, wherein the vehicle group generator is configured to:
group vehicles entering into or locating in a virtual zone to at least one vehicle group according to the predetermined similarity condition; and
update the at least one vehicle group when at least one of associated vehicles leaves the virtual zone and when at least one vehicle having the predetermined similarities enters the virtual zone.

18. The server of claim 15, wherein the pattern model generator is configured to:
obtain driving patterns of vehicles in each vehicle group based on the collected information;
analyze the obtained driving patterns by comparing a driving pattern of one vehicle with others and find abnormal driving patterns among the obtained driving patterns;
model the abnormal driving patterns based on the analysis result to generate the abnormal driving pattern model for each vehicle group; and
update the generated abnormal driving pattern model of each vehicle group by repeatedly performing the obtaining the driving patterns, the analyzing the obtained driving patterns, and the modeling the abnormal driving patterns.

19. The server of claim 15, wherein the spot generator is configured to:
analyze correlation between one spot with others in an associated virtual zone; and
update the associated virtual zone based on the analysis result.

20. The server of claim 15, wherein the spot generator is configured to:
collect information from vehicles passing through the generated spot;
maintain the generated spot when the vehicles have driving patterns matched with attributes of the generated spot based on the collected information;
eliminate the generated spot when the vehicles have no driving patterns matched with attributes of the generated spot based on the collected information.

\* \* \* \* \*